United States Patent [19]

Connolly

[11] Patent Number: 5,417,955
[45] Date of Patent: May 23, 1995

[54] MANUFACTURE OF FERRIC SULFATE AND HYDROCHLORIC ACID FROM FERROUS CHLORIDE

[76] Inventor: David W. Connolly, 5338 Casa Royal, St. Louis, Mo. 63129

[21] Appl. No.: 204,068

[22] Filed: Mar. 1, 1994

[51] Int. Cl.$^6$ ............ C01B 7/07; C01B 7/01; C01G 49/00
[52] U.S. Cl. ............ 423/488; 423/481; 423/558; 423/DIG. 1
[58] Field of Search .......... 423/481, 488, 558, DIG. 1

[56] References Cited

U.S. PATENT DOCUMENTS

| | | | |
|---|---|---|---|
| 1,430,551 | 10/1922 | Herrly | 423/558 |
| 3,542,508 | 11/1970 | Sercombe et al. | 423/DIG. 1 |
| 3,635,664 | 1/1972 | Morimoto | 423/481 |
| 4,102,784 | 7/1978 | Schlauch | 210/47 |
| 4,222,997 | 9/1980 | Beecher | 423/481 |
| 4,255,407 | 3/1981 | Puurunen | 423/DIG. 1 |
| 4,362,916 | 5/1983 | Beecher | 423/481 |
| 4,436,681 | 3/1984 | Barczak et al. | 264/67 |
| 4,707,349 | 11/1987 | Hiersted | 423/558 |
| 5,154,769 | 10/1992 | Kuske et al. | 106/459 |
| 5,181,993 | 1/1993 | Furuya | 204/86 |
| 5,194,240 | 3/1993 | Derka | 423/558 |
| 5,194,241 | 3/1993 | Derka | 423/558 |
| 5,266,297 | 11/1993 | Kodama | 423/DIG. 1 |

FOREIGN PATENT DOCUMENTS

| | | | |
|---|---|---|---|
| 46-63154 | 8/1976 | Japan | 423/558 |
| 251495 | 5/1926 | United Kingdom | 423/558 |
| 562596 | 7/1944 | United Kingdom | 423/558 |

*Primary Examiner*—Gary P. Straub
*Attorney, Agent, or Firm*—Polster, Lieder, Woodruff & Lucchesi

[57] ABSTRACT

A two step method of converting ferrous chloride from a pickling liquor to produce hydrochloric acid and ferric sulfate is disclosed. The ferrous chloride is first mixed with sulfuric acid to produce ferrous sulfate and HCl. The HCl is carried to an absorbtion tower where most of the HCl is collected and the remainder is returned to the reactor. The ferrous sulfate is separated from the sulfuric acid. The unreacted sulfuric acid is returned to the reactor and the ferrous sulfate is transported to a second reactor where it is reacted with sulfuric acid and air (O$_2$) to produce ferric sulfate. The ferric sulfate is removed from the second reactor. Both reactions are carried out at relatively low temperatures under atmospheric pressures.

23 Claims, 1 Drawing Sheet

MANUFACTURE OF FERRIC SULFATE AND HYDROCHLORIC ACID FROM FERROUS CHLORIDE

BACKGROUND OF THE INVENTION

This invention relates to the production of ferric sulfate, and in particular to the production of ferric sulfate and hydrochloric acid from ferrous chloride or liquors containing ferrous chloride produced in the production of steel or from other industries.

In the processing of steel, steel is pickled with hydrochloric acid. The pickling of the steel produces a waste liquor containing $FeCl_2$ and HCl. Often, the liquor is discarded, adding to the already existing pollution problems. Various methods have been introduced to treat the pickling liquor. As described in U.S. Pat. Nos. 4,382,916 and 4,222,997, both to Beecher, the hydrochloric acid has been recovered from pickle liquor. The Beecher process produces ferrous sulfate as a by-product. Beecher recovers the hydrochloric acid by condensing pickling liquor to remove HCl and water from the feed stream. He does this by boiling the feed stream. The concentrated pickle liquor is then added to sulfuric acid to produce ferrous sulfate. The HCl and water vapors are recovered using extensive heat recovery equipment.

A roasting process, described in Barczak U.S. Pat. No. 4,436,681 et al., recovers HCl from pickle liquor by injecting the pickle liquor into a roasting chamber at very high temperatures (1,600° F.) using a very high pressure to obtain a fine spray. This process converts the ferrous chloride to $Fe_2O_3$ and HCl. It uses a great deal of energy and requires high maintenance costs. The $Fe_2O_3$ produced is of poor quality and low value.

These products (ferric oxide, ferrous sulfate, and HCl) are of relatively low value. The processes, which are expensive to setup and operate, therefore, can not be economically justified. However, the ferrous sulfate can be oxidized to produce ferric sulfate. Ferric sulfate has many uses and has a higher value. For example, its main use is as a flocculent to remove particulate matter in potable water plants. It is also used to remove phosphates and $H_2S$ from waste streams or as an animal food additive. I presently know of no processes that propose to use the ferrous chloride from the pickling liquor to produce ferric sulfate. Such a process is of particular value at this time because of the need to replace alum as a flocculent in the potable water industry. Alum is becoming subject to more restrictive regulations because of its potential dangers. Ferric sulfate is equal to or better than alum as a flocculent without the potential dangers posed by the use of alum.

SUMMARY OF THE INVENTION

One object of the present invention is to provide a process to produce ferric sulfate from ferrous chloride.

Another object is to provide such a process wherein the HCl used to pickle steel and the HCl produced in the conversion process is recovered, and that which is not recovered is recycled.

Another object is to provide such a process in which the HCl is recovered using an air sweep through an HCl generator and recovering the HCl in an absorbing tower to which the air sweep is directed.

Another object is to provide such a process wherein the risk of release of HCl to the atmosphere is substantially reduced.

Another object is to provide such a process which can be carried out at relatively low temperatures.

Another object is to provide such a process which is economical to operate and less expensive than existing conversion plants to build.

These and other objects will become apparent to those skilled in the art in light of the following disclosure and accompanying drawing.

According the invention, generally stated, ferrous chloride is converted to ferric sulfate in a two step process. Initially, ferrous chloride is reacted with sulfuric acid in an HCl generator to produce ferrous sulfate and HCl. The ferrous sulfate is then reacted with sulfuric acid and air in a ferric sulfate reactor to produce ferric sulfate. Both reactions are carried out at between 120° and 400° F. and preferably at about 180° F. The reactions are carried out preferably at atmospheric pressures and without the use of catalysts, although catalysts can be used to enhance the reaction. The reactants are brought to temperature by cycling the reactants through heat exchangers or by enveloping the reactors in steam jackets. Other methods to heat the reactants can, of course, be used. The reactants in both reactors are mixed, preferably with the use of air jets or agitators.

In the first reaction, the HCl and ferrous sulfate are removed from an HCl generator in separate product lines. The HCl, which is in a vapor state, is passed through an absorber. Most of the HCl is collected and the remainder is recycled back to the HCl generator. An air stream is cycled through the reactor and carries the HCl vapor to the absorber and back to the HCl generator. Water may be introduced into the air stream to control the HCl concentration. Preferably, the collected HCl is about 21% HCl by weight. This is near its azeotrope and reduces the amount of HCl which is recycled, and to ensure that most of the HCl is collected. The returning air, water, and uncollected HCl are preferably cooled, preferably to about 110° F.

The ferrous sulfate product line also includes sulfuric acid and water. The ferrous sulfate, which has been precipitated out, is separated from the sulfuric acid and water, which are returned to the HCl generator. The ferrous sulfate is then transported to the ferric sulfate reactor.

The second reaction is maintained at the desired temperature by cycling the reactor contents through a heat exchanger. The ferric sulfate solution product is pumped from the reactor contents for collection. The reactor contents are pumped through a heat exchanger to maintain the reactor contents at a desired temperature (preferably about 180° F.) and then returned to the ferric reactor. Preferably, a portion of the ferric product is pumped out after the reactor contents are heated and before the heated reactor contents are returned to the reactor. The returning reactor contents are passed through mixing jets to mix the contents. Air is injected into the return line to aid in the mixing of the reactor contents and to provide oxygen to oxidize the ferrous sulfate to ferric sulfate. The product line is about 50% $Fe_3(SO_4)_3$, by weight, and about 12% $Fe+++$ by weight.

This process provides a more efficient manner of collecting the HCl since it is not dependent on condensing HCl/water vapors directly, as is Beecher. Further, because the uncollected HCl is recycled, the risk of pollution is reduced, thereby reducing the need for multiple absorbers. Only one absorber is needed in my process, making the initial cost of a conversion plant, and operation of the conversion plant, less expensive.

BRIEF DESCRIPTION OF THE DRAWING

The Figure is a schematic representation of the process of the present invention.

DESCRIPTION OF THE PREFERRED EMBODIMENT

Figure 1:
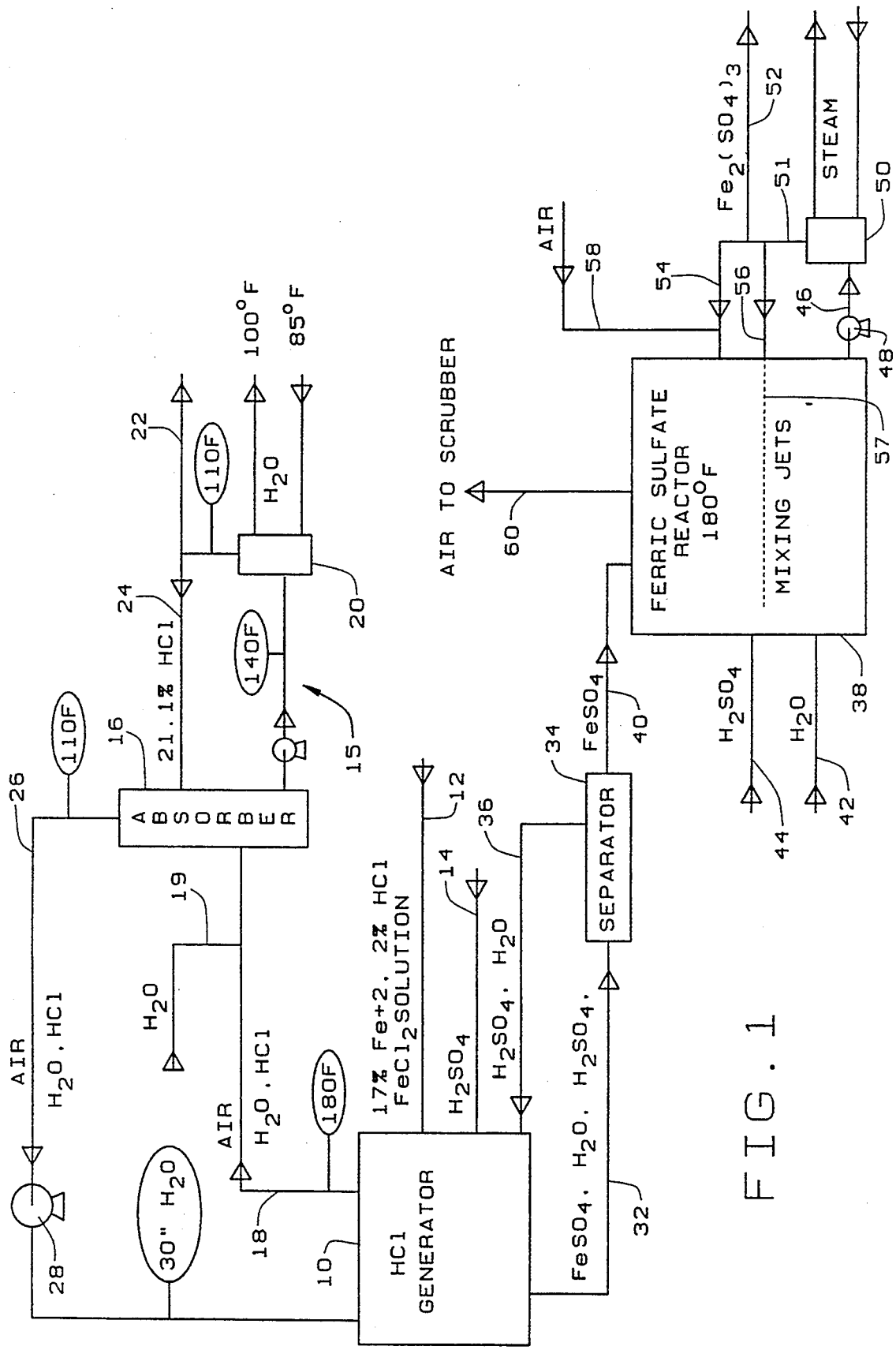

My process manufactures $Fe_2(SO_4)_3$ and HCl from an $FeCl_2$ pickle liquor or any ferrous chloride solution or crystal. The ferrous chloride solution is preferably a pickling liquor produced from the pickling of steel which contains $H_2O$, HCl, and $FeCl_2$. Often the pickling liquor is 38% $FeCl_2$ and 2% HCl, by weight, the remainder being water.

The process is essentially a two step process. In a first step, the ferrous chloride is mixed with hot sulfuric acid to release the chloride from the ferrous chloride molecule. The sulfuric acid, prior to mixing with the $FeCl_2$, is preferably about 93% $H_2SO_4$ by weight and is preferably heated to between 100-200° F. The sulfuric acid in the reactor may have a concentration of 10-98% by weight, and preferably a concentration of about 60% by weight. The sulfuric acid concentration in the generator 10 is in part dependant on the $FeCl_2$ content of the pickle liquor. The reaction is carried out in an HCl generator 10 at a temperature of between 60° F.-300° F., preferably at about 180° F. The reactants preferably have a residence time of about four hours in the reactor. The generator is purged with air as the reaction is carried out. Air is introduced into the reactor at a rate of 1600 CFM. This first step produces ferrous sulfate and hydrochloric acid according to the following equation:

(1) 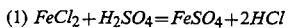

The hydrochloric acid (HCl) vapor and water vapor are carried off by the air stream to an absorption system having an absorber 16 where HCl is recovered. Most of the HCl 15 is removed from the air stream for collection. Water may be introduced into the air stream to absorber 16 or into the absorber itself to control the HCl concentration. Preferably the HCl solution exiting the absorber has a concentration of about 21%, by weight. This concentration is close to the azeotrope of hydrochloric acid, and is a common concentration used in the pickling of steel. This HCl may be returned to the steel plant for use in pickling more steel. Bringing the HCl to its azeotrope also reduces the amount of HCl which is recycled, and thus increases the amount of HCl which is collected on the first pass of the air sweep through the absorbtion system. Thus, most of the HCl generated by the first reaction is collected If the HCL were, for example, at 23%, the amount of HCl recycled would triple.

The uncollected HCl, water vapor and air are returned to the generator. The amount of HCl carried off by the air stream is dependant on the air temperature. Although the reactor temperature could be reduced if higher concentrations of sulfuric acid were used, a higher temperature is preferred so that the air stream will entrain a larger amount of HCl. The higher temperature also allows for a reduction of the residence time of the reactants in the HCl generator. The air stream thus has a temperature which is lower than the boiling point of HCl (230° F.) or the boiling point of a water-HCl binary system (227.4° F.). The HCl is cooled preferably to between 60° F. and 110° F. in the absorbtion system to aid in collection of the HCl. The recycled air is reheated preferably to about 180° F. as it passes through the hot sulfuric acid in the HCl generator to pick up additional HCl and water.

This first step is unique in that the hydrochloric acid and water vapors are swept out of the HCl generator by an air purge and are recovered using an absorbing tower 16. The air stream, with uncollected HCl, is recycled back through the HCl generator. Because the air stream for the HCl reactor is maintained in a continuous cycle, any HCl which is not collected is returned to the HCl generator. Thus, no HCl is released to the atmosphere. My process thus substantially eliminates any air pollution problems associated with HCl absorption. Further, because the air stream is recycled, rather than being released to the atmosphere, the HCl is also recycled. This allows for the use of a minimum number of absorbtion towers or columns. In fact, although more absorbtion towers could be used, only one tower is needed and preferably only one tower is used. This reduces the equipment and operating costs of a conversion plant.

The ferrous sulfate is removed from the generator in a second product line which also contains sulfuric acid and water. Although $FeSO_4$ is very soluble in a hot aqueous solution, its solubility decreases substantially in the presence of increasing amounts of sulfuric acid. The process takes advantage of this decreasing solubility in order to recover the $FeSO_4$ from the sulfuric acid and water. By maintaining the concentration of sulfuric acid in the HCl generator at about 60% by weight, the ferrous sulfate precipitates and can be separated from sulfuric acid in a separator. The second product line thus contains a slurry. This slurry is delivered to a separator 34 where the ferrous sulfate is separated from the sulfuric acid and water. The separation may be carried out using a centrifuge, filter, cyclone, settling tank, or any other desired separating means. The sulfuric acid and water are returned to the HCl generator to replenish the sulfate used in the reaction. This recycling of the sulfuric acid increases the yield of the reaction (1) by increasing the number of sulfate molecules present and decreases the amount of fresh sulfuric acid needed for the reaction. In a batch operation the sulfuric acid to replenish the sulfate can be added at the start of the operation or periodically during the reaction.

The ferrous sulfate is delivered to a second reactor, a ferric sulfate reactor 38, where it is oxidized to ferric sulfate in the presence of at least stoichiometric amounts of sulfuric acid according to the reaction:

(2) 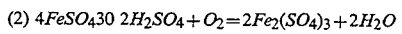

When less than stoichiometric amounts of sulfuric acid are used, the ferric sulfate forms a basic polymer. Preferably the reactor is monitored to keep the sulfuric acid at about stoichiometric amounts. Most preferably, the sulfuric acid is maintained just slightly below stoichiometric amounts. When stoichiometric amounts of sulfuric acid are present, the sulfuric acid will react with the ferrous sulfate, reducing the sulfuric acid concentration in the reactor. This will help prevent the precipitation of ferrous sulfate in the reactor. It further prevents the final product from having excess or free acidity and thus reduces the amount of ferrous sulfate in the final product. The ratio of the sulfate ion to the iron ion is thus monitored to provide for near complete oxidation so that the solution will contain ferric sulfate with substantially no excess or free sulfuric acid. Preferably, the ratio of the sulfate ion to iron ion is between 1.6 and 1.45, and is preferably about 1.5.

The reactants (water, sulfuric acid, air (oxygen), and ferrous sulfate) are thoroughly mixed in the ferric sulfate reactor using mixing jets. Air is passed into the reactor at a rate of 10–500 CFM using an aeration jet or any other device to effectively add air to the system at atmospheric pressures. The air stream, in addition to mixing or agitating the reactor contents, provides the oxygen for the oxidation of the ferrous to ferric. The reaction preferably is carried out at a temperature of between 120° F. and 300° F., and preferably at about 180° F. The reactants preferably have a residence time of 18 hours in the reactor.

With a feed of 44000 lbs/day of ferrous chloride solution containing 17% Fe++ by weight, it is reasonable to expect a production rate of about 21 tons of ferric sulfate a day by sizing the equipment correctly. The iron in the finished product stream is about 12% ferric iron. The whole process should take about 18 hours. The above reaction can be accomplished in a batch or continuous reaction.

EXAMPLE 1

With reference to the FIGURE, 44,000 lbs/day of pickling liquor is introduced into an HCl generator 10 by a feed line 12 at a rate of about 30.56 lbs/min on a continuous basis. Prior to starting the feed, the HCl generator 10 is filled with sulfuric acid and $H_2O$ which is heated to about 180° F. The sulfuric acid charge is preferably about 60% $H_2SO_4$ by weight. The feed line includes 38.6% $FeCl_2$ (17% Fe++) and 2% HCl by weight, the remainder being water. The pickling liquor is initially filtered to remove any dirt and carbon present in the solution.

A feed of 9.77 lbs/min of sulfuric acid is introduced into the reactor through a line 14. The reactants are heated, preferably to 180° F., and mixed using mixing jets or an agitator. The ferrous chloride and sulfuric acid react according to the above equation (1) to produce HCl and ferrous sulfate. Air is cycled through the generator 10 and carries off HCl and water vapor to an absorber 16 through a line 18.

In continuous operation, about 1600 CFM of recycled air will carry of 19.4 lbs/min of water vapor and 7.81 lbs/min of HCl to absorber 16. The temperature in line 18 is about 180° F., the temperature at which the reaction was carried out in HCl reactor 10. The HCl that is entrained in the air stream is about 28%–29% by weight HCl. Water is therefore added to line 18 through a line 19 to control the HCl concentration. Water can alternatively be added to the absorbtion tower 16. The HCl concentration is controlled to be close to its azeotrope, about 21% HCl by weight. About 1.45 GPM of water are introduced into the air line 18 to bring the HCl to this concentration. The water and HCl are cycled through a heat exchanger 20 to cool the water and HCl to 110° F. Heat exchanger 20 is preferably a 1,750,000 BTU/hr exchanger which uses water as the cooling medium. About 35 lbs/min of 21.1% HCl by weight are removed from the cooled stream through a line 22 for collection. The uncollected HCl, which is also at concentration of about 21.1% by weight, is cycled back into the absorber through line 24. A line 26 exits absorber 16 to carry HCl, water, and air back to generator 10. The temperature in return line 26 is about 110° F. A blower 28 is placed in line 26 and increases pressure in the line to 30″ $H_2O$. Upon entering the generator 10, the air is reheated to entrain additional HCl for collection.

In the presence of sulfuric acid and the absence of chlorides in the HCl generator 10, the ferrous sulfate precipitates out. A second product line 32 carries the ferrous sulfate product, sulfuric acid, and water from generator 10 to a separator 34. Separator 34 removes about 17.44 lbs/min of ferrous sulfate from the water and sulfuric acid. The water and sulfuric acid are returned to generator 10 by a line 36.

The ferrous sulfate is introduced into a ferric sulfate reactor 38 by a line 40. Water (about 20.2 lbs/min) and sulfuric acid (4.9 lbs/min) are introduced into reactor 38 by feed lines 42 and 44, respectively. The ferrous sulfate reacts with the sulfuric acid and oxygen to produce ferric sulfate in accordance with reaction (2) set forth above. The reaction is carried out at about 180° F. under atmospheric pressures.

The ferric sulfate reactor contents are cycled through a heat exchanger 50. They are removed from the reactor through a line 46 having a pump 48. Heat exchanger 50 heats the reactor contents, with steam, to about 180° F. Because the reactants are heated using exchanger 50, a separate heater is not needed for the reactor, however, heat exchangers installed inside the reactor could also be used, as could a reactor having a steam jacket or the use of live steam.

A line 51 from heat exchanger 50 carries the reactor contents to a line 52 where 43.29 lbs/min of 43% ferric sulfate are pumped to storage tanks. Not all the ferric sulfate is removed to storage at this point. Some of the product, along with the heated reactants, are directed back to reactor 38 through two lines 54 and 56. A splitter, for example, could be used to direct the flow of product between storage and the reactor. Lines 54 and 56 pass the ferric sulfate through mixing jets 57 to ensure that the reactants in the reactor are well mixed. By returning the ferric sulfate to the reactor, the residence time of ferrous sulfate in the reactor is increased, increasing the conversion ratio of ferrous sulfate to ferric sulfate. Thus, the ferric sulfate which is removed is very pure. Preferably, the solution in product line 52 is about 12% $Fe^{+++}$.

Air is also introduced into the reactor at a rate of about 50–250 CFM to provide oxygen for the oxidation of ferrous to ferric. An air line 58 communicates with return line 54. Line 54 has a mixing jet, as described above, and the air thus aids in mixing of the reactor contents. The air from reactor 38 is directed to a scrubber through a line 60 prior to being released into the atmosphere. No HCl enters the reactor 38. Thus, the scrubbed air can be released to the atmosphere without substantial risk of polluting the environment with HCl.

If a batch system is desired to convert the ferrous sulfate to ferric sulfate in reactor 38, 29,119.8 lbs of water and 7,033.5 lbs sulfuric acid are initially fed into the reactor 38. After the reactor has been charged with water and sulfuric acid, 25,111.4 lbs ferrous sulfate crystals for the HCl generator 10 are added to the reactor. As in the continuous process, the reactants are heated to 180° F. with good agitation and oxidized with air.

Example 2

In this example, a pickling liquor containing 11.5% Fe++ and 3% HCl by weight is introduced into the HCl reactor, after filtering, at a rate of 44000 lbs/16 hrs (a rate of approximately 45.8 lbs/min.). The HCl reactor is fed with 40–80% $H_2SO_4$ which is heated to 120° F.–220° F. The sulfuric acid is introduced into the reactor at a rate of about 9.9 lbs/min. An air sweep of 1500–3500 CFM air is cycled through the HCl generator and absorber. Under these conditions, approximately 17.7 lbs/min ferrous sulfate will be produced which is then delivered to the ferric sulfate reactor. The HCl produced in the HCl generator is about 20% by weight. Water therefor does not have to be added to the air sweep line to dilute the HCl.

The feed of sulfuric acid is introduced into the ferric sulfate reactor at a rate of about 4.95 lbs/min about sixteen hours after the process has begun. At this same time, ferric sulfate is drawn off the reactor at a rate of about 43.92 lbs/min and delivered to storage. This process will produce about 42,167 lbs of 43% ferric sulfate by weight daily.

If a batch system is to be used, the ferric sulfate reactor is charged with 19,695.5 lbs of water and 4,761 lbs of sulfuric acid.

Various changes to the invention, within the scope of the appended claims, may be apparent to those skilled in the art. For example, the sulfuric acid that is returned to the HCl generator could form part of the sulfuric acid feed for the ferric sulfate reactor. In either case, the sulfuric acid is recycled for further use. The temperature and concentrations can be changed to change the product recovery rate as needed (i.e. to increase or decrease the reaction rate). The residence times in the HCl generator and ferric sulfate reactor can be changed. These examples are merely illustrative.

I claim:

1. A method for producing ferric sulfate from ferrous chloride comprising: reacting ferrous chloride with sulfuric acid in an HCl generator to produce ferrous sulfate and HCl;
    passing an air sweep through said HCl generator;
    entraining HCl vapor in said air sweep;
    collecting said entrained HCl from said air sweep;
    returning said air sweep and uncollected HCl to said HCl generator;
    removing a product stream from said HCl generator containing said ferrous sulfate and unreacted sulfuric acid:
    separating said ferrous sulfate from said unreacted sulfuric acid;
    adding sulfuric acid to the HCl generator to replenish sulfuric acid consumed to make ferrous sulfate;
    introducing said ferrous sulfate to a ferric sulfate reactor;
    reacting the ferrous sulfate with sulfuric acid and oxygen in said ferric sulfate reactor to produce ferric sulfate; and
    collecting the ferric sulfate.

2. The method of claim 1 wherein said ferrous chloride is added to said sulfuric acid, said method including an initial step of charging said HCl generator with excess sulfuric acid and heating said sulfuric acid to between 60–300° F.

3. The method of claim 2 wherein the reactants in said HCl generator are heated to between 60° F. and 300° F.

4. The method of claim 3 wherein the reactants in said HCl generator are heated to about 180° F.

5. The method of claim 2 wherein said HCl generator is maintained at atmospheric pressure.

6. The method of claim 2 including a step of continuously mixing said reactants in said HCl generator with an agitator.

7. The method of claim 1 wherein said step of collecting said HCl includes passing said HCl vapor entrained in said air sweep through an absorber and absorbing said HCl vapor.

8. The method of claim 7 including the step of controlling the concentration of the HCl in the absorber by the step of adding water to one of said air sweep and said absorber.

9. The method of claim 8 wherein said step of controlling the concentration of said HCl includes maintaining said HCl concentration at about 21%.

10. The method of claim 1 wherein said second reaction includes heating the reactants of said ferric sulfate reactor to between 120° F. and 300° F.

11. The method of claim 10 wherein said ferric sulfate reactor reactants are heated to about 180° F.

12. The method of claim 10 wherein said heating step includes heating the contents of said ferric sulfate reactor in a heat exchanger.

13. The method of claim 12 including introducing an air stream into said ferric sulfate reactor, said air stream providing said oxygen for said reaction.

14. The method of claim 13 including a step of mixing the reactants of said ferric sulfate reactor; said air being introduced into a line which returns the reactants from the heat exchanger to the ferric sulfate reactor, said mixing step including passing said air and reactants through mixing jets.

15. The method of claim 1 wherein the amount of sulfuric acid in said ferric sulfate reactor is about a stoichiometric amount.

16. The method of claim 15 wherein the amount of sulfuric acid used in said ferric sulfate reactor is slightly less than stoichiometric amounts.

17. The method of claim 15 wherein the ratio of sulfate ions to iron ions is from about 1.6 to about 1.45.

18. A method for producing ferric sulfate from ferrous chloride comprising:
    charging a reactor with said ferrous chloride and excess sulfuric acid, said sulfuric acid being 10%–98% sulfuric acid by weight;
    reacting said ferrous chloride with said sulfuric acid to produce ferrous sulfate and HCl at a temperature of between 60° F. and 300° F.;
    passing an air sweep through said HCl generator;
    entraining HCl in said air sweep;
    collecting said entrained HCl from said air sweep;
    controlling the concentration of said HCl such that the concentration of HCl in said air sweep is at about the azeotropic concentration of said HCl;
    removing a product stream from said HCl generator containing said ferrous sulfate and up-reacted sulfuric acid
    separating said ferrous sulfate from said unreacted sulfuric acid in said product stream;
    reacting said ferrous sulfate with sulfuric acid and oxygen at a temperature of between 120° F. and 300° F. to produce ferric sulfate; and
    collecting said ferric sulfate, the concentration of the ferric sulfate in said solution being about 43%.

19. The method of claim 18 wherein said step of controlling said HCl concentration includes adding water to said air sweep.

20. The method of claim 19 including a step of returning said air sweep and uncollected HCl to said reactor.

21. The method of claim 17 wherein each reaction is carried out at about 180° F.

22. The method of claim 21 wherein each said reaction is carried out at atmospheric pressures.

23. The method of claim 18 including a step of adding sulfuric acid to the HCl generator to replenish sulfuric acid consumed to make ferrous sulfate.

* * * * *